May 5, 1931.　　　F. A. JOSEPH　　　1,804,014
FREE WHEEL CLUTCH
Filed Sept. 1, 1928　　　5 Sheets-Sheet 1

FELIX ALEXANDER JOSEPH
INVENTOR

By D. Anthony Usina
ATTORNEY

May 5, 1931.  F. A. JOSEPH  1,804,014
FREE WHEEL CLUTCH
Filed Sept. 1, 1928   5 Sheets-Sheet 2

FELIX ALEXANDER JOSEPH
INVENTOR

BY Anthony Msina
ATTORNEY.

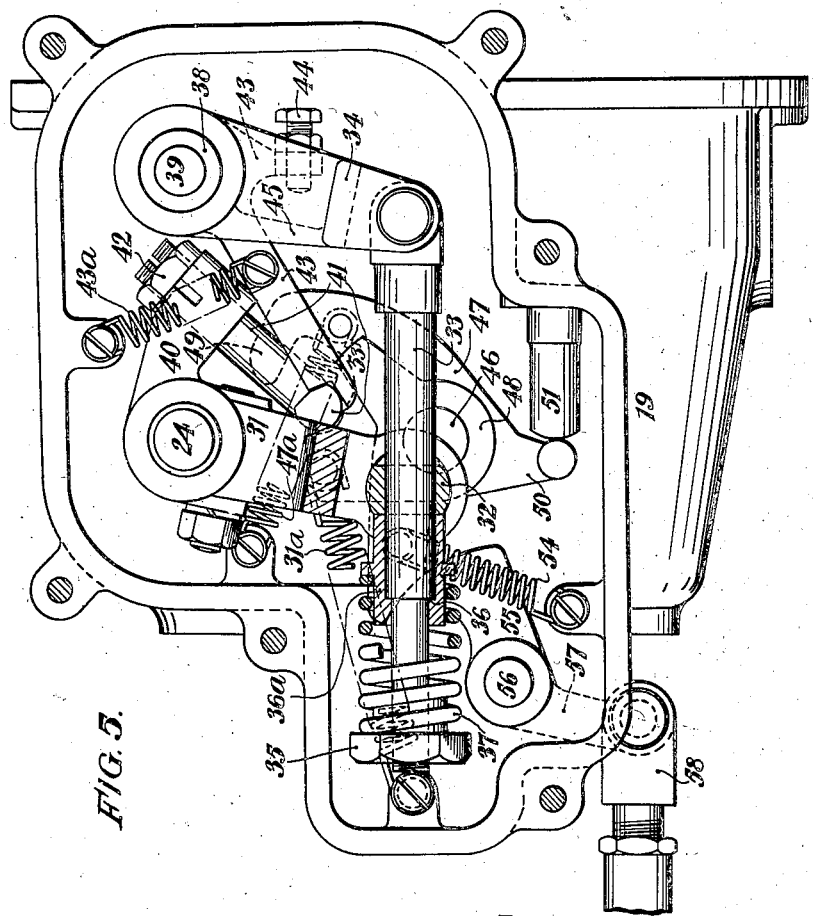

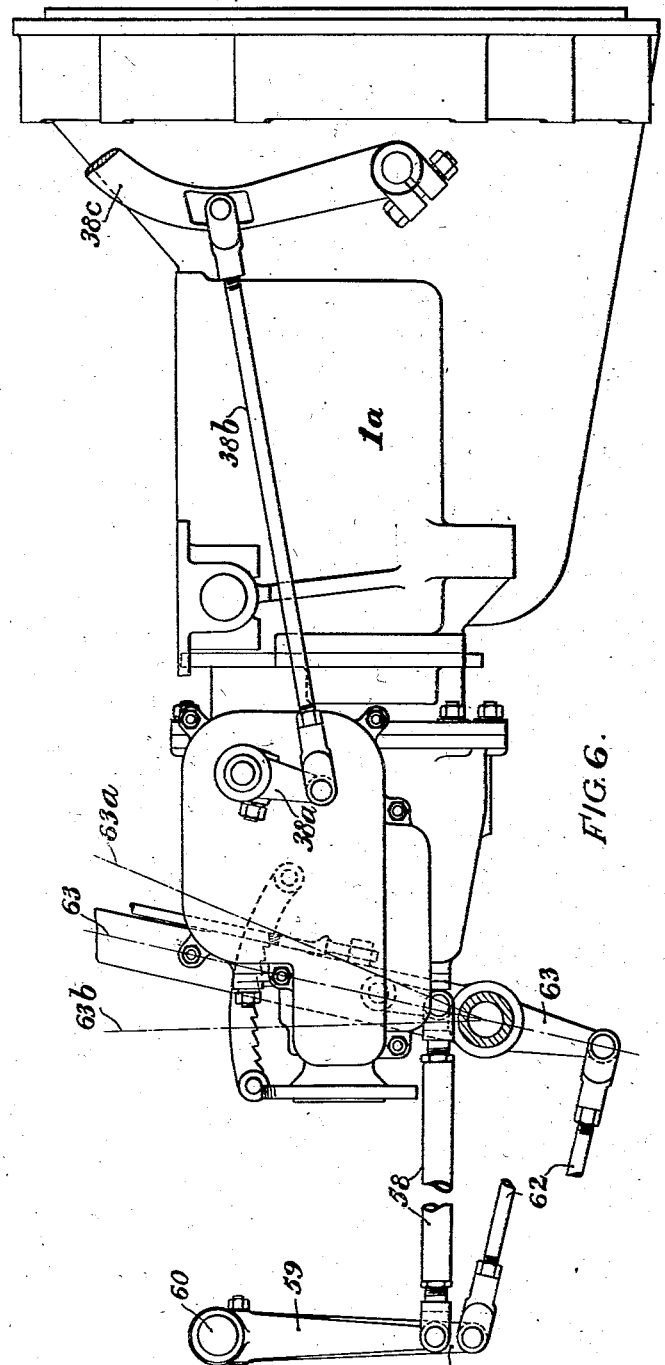

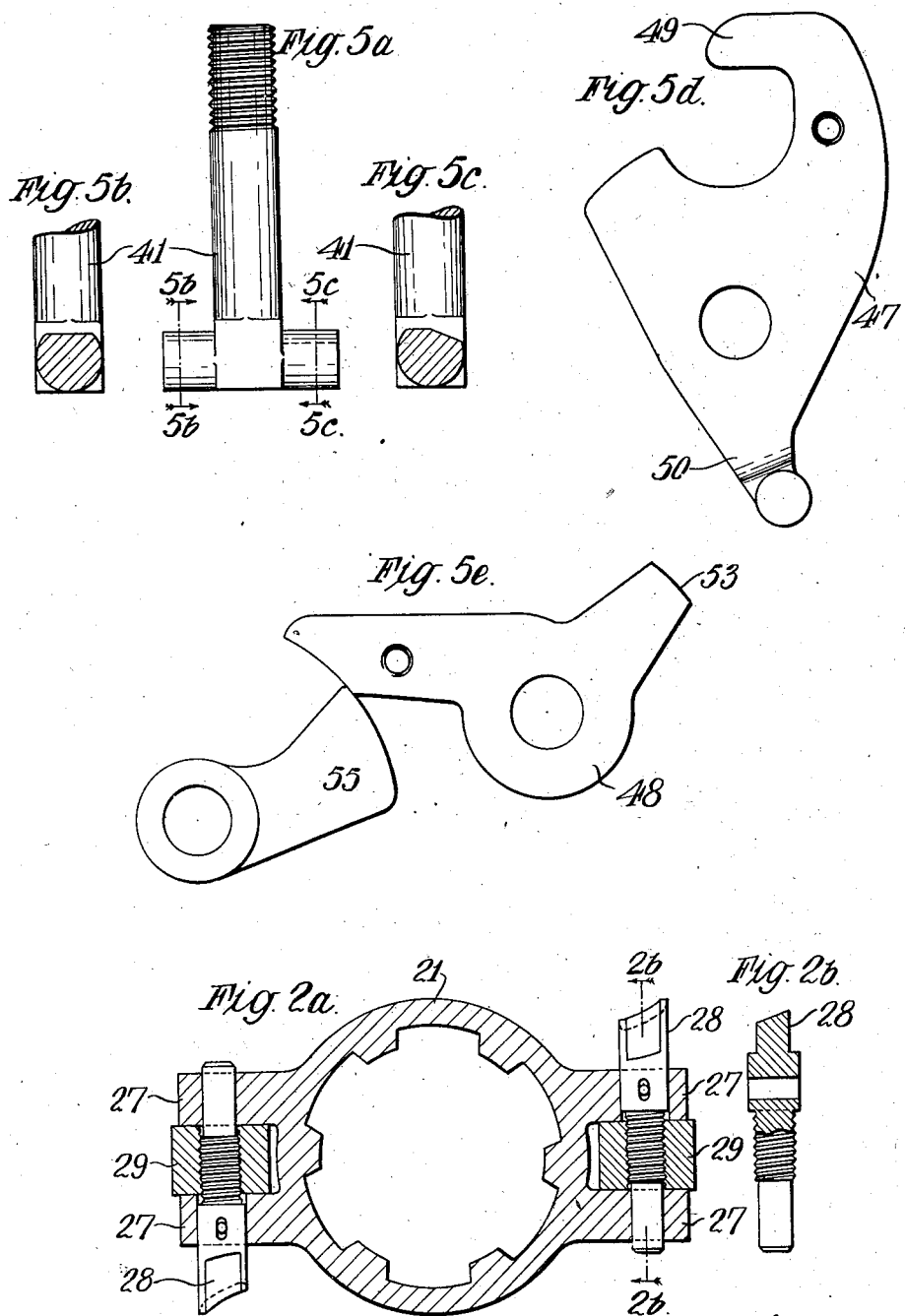

Patented May 5, 1931

1,804,014

UNITED STATES PATENT OFFICE

FELIX ALEXANDER JOSEPH, OF HAMPSTEAD, LONDON, ENGLAND

FREE-WHEEL CLUTCH

Application filed September 1, 1928, Serial No. 303,561, and in Great Britain October 3, 1927.

This invention relates to free-wheel clutches and has for its object improvements in or relating thereto.

A free-wheel clutch made according to this invention comprises a driving member, a driven member, one or more main wedging members, and one or more auxiliary wedging members for assisting the main wedging member or members to be carried into their wedging position, the said auxiliary wedging members being adapted to wedge in one direction of rotation and to be free in the other direction of rotation.

The main wedging members may be supported in a cage and the auxiliary wedging members adapted to co-act with the cage. In one form the driven member is in the form of a cam and the driving member has a working surface in the form of a surface of revolution (hereinafter referred to as the "abutment member") and the auxiliary wedging members are adapted to wedge between members, one of which is connected with the abutment member and the other with the cage. But it is to be understood that the abutment member, alternatively, may be the driven member and the cam member the driving member.

In my British patent specification No. 261,486 I showed a friction coupling in the form of flat springs between a cage carrying the wedging members and the abutment member; the purpose of which was to enable the cage carrying the wedging members to be moved into wedging position and, to a certain extent, to encourage or excite the self wedging action of these wedging members. One purpose of the present invention is to increase this contributory action by the employment of auxiliary wedging members which are adapted to wedge between members, one of which is connected with the said cage and the other with the abutment member and thereby force the main wedging members into engagement, as soon as the driving portion of the device has overtaken the driven portion. At the same time friction is reduced to a minimum when the clutch is "free-wheeling", as the auxiliary wedging members are free at such times.

In free-wheel clutches employing wedging members acting between inclined faces, it is well known that a small angle between the faces is conducive to wedging while a large angle is liable to result in failure to wedge, especially when the clutch is subject to shock. At the same time a small angle results in great stresses being produced which are liable to be destructive of the co-acting parts. In order to obtain reliable wedging and at the same time to keep the stresses low, I may provide a small angle for the auxiliary wedging members and a larger angle for the main wedging members. Furthermore, as in some uni-directional clutches, there is the possibility sometimes of engagement not taking place at the instant when the driving member has overtaken the driven member. This may be due to delay in the wedging of the wedging members, and as the auxiliary wedging members must necessarily wedge before the main wedging members, there is risk at such times of the whole load being transmitted through the auxiliary wedging members, and thereby destroying them or their co-acting parts. In order to protect the auxiliary wedging members and their co-acting parts from being subjected to any excessive loads, I provide means for limiting the torque which is capable of being transmitted through the auxiliary wedging members, the auxiliary wedging members being provided with a yielding co-acting part which limits the strain on the cage. The auxiliary wedging members may conveniently be comprised in an auxiliary uni-directional clutch acting between the cage and the abutment member, the driving or driven member of the auxiliary uni-directional clutch being yieldably coupled, preferably by friction, with suitable portions of the cage or abutment member.

In one construction this is effected by means of a yielding connection between the auxiliary cam member and the main abutment member comprising two friction surfaces held in contact by spring pressure and arranged to slip when overloaded.

Where main wedging members are provided for wedging in both directions, as in a bi-directional coupling, they may be assisted into engagement in one direction by auxiliary wedging members and in the other direction by means preferably of a spring. In a bi-directional coupling adapted to operate temporarily as a forward uni-directional clutch, it is preferable for the auxiliary wedging members to act in forward direction and for the spring to act in the reverse direction, as this permits of free-wheeling, without requiring additional means to hold the auxiliary wedging members out of operation.

Such a coupling device is of particular value in automobiles and may be assembled immediately behind the gear box, and adapted to facilitate gear changing. Means for enabling the device to free wheel may comprise restraining means adapted to co-act with the cage and render the main wedging members inoperative in the reverse direction.

The said restraining means may comprise a member on and adapted to rotate with the cam member and further adapted to engage with a co-acting member fixed to the cage. Means may be provided for holding the restraining member in its restraining position and for automatically releasing the said restraining member, as soon as the driving member has overtaken the driven member.

In one form the restraining member comprises an axially slidable member carried on loosely fitting splines (or the like) on the cam member to allow a small angular movement to take place, and springs (or the like) may be provided to maintain the slidable member in one extreme position of angular movement on the splines so as to prevent releasing or unlatching of the restraining member under certain conditions, as explained in the description of the device illustrated in the drawings.

The axially slidable member may be adapted to assume three axial positions; two extreme positions in which the cage is free and an intermediate position in which the cage is restrained. Means may be provided for preventing the axially slidable member when in the intermediate position from returning to one extreme position until the driving member has overtaken the driven member, whilst permitting the axially slidable member to be moved when desired into the other extreme position, for the purpose of ensuring bi-directional coupling.

Referring to the drawings filed herewith which illustrate one form of device, according to this invention, designed for use on an automobile immediately behind the gear box:—

Figs. 1, 2 and 3 are transverse sections taken on the lines 1—1, 2—2, and 3—3 Fig. 4 respectively.

Figures 2a and 2b are enlarged detail views showing the parts 27, 28 and 29 in their respective relative positions.

Fig. 5 is a sectional elevation showing the operating mechanism.

Figures 5a, 5b and 5c show detail views of part 41 shown in Figure 5. Figure 5d is a detail view of the part 47. Figure 5e is a detail view of the parts 48 and 55 showing the relative positions of these parts.

Fig. 6 is an elevation showing the assembly of the device, gear box and the controls.

Figure 1:
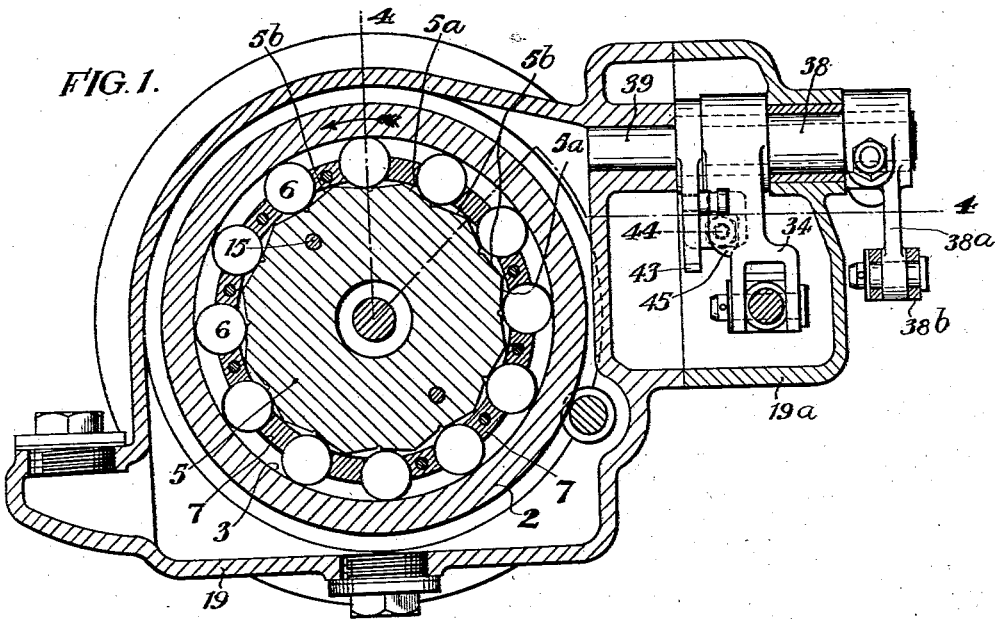
Figure 2:
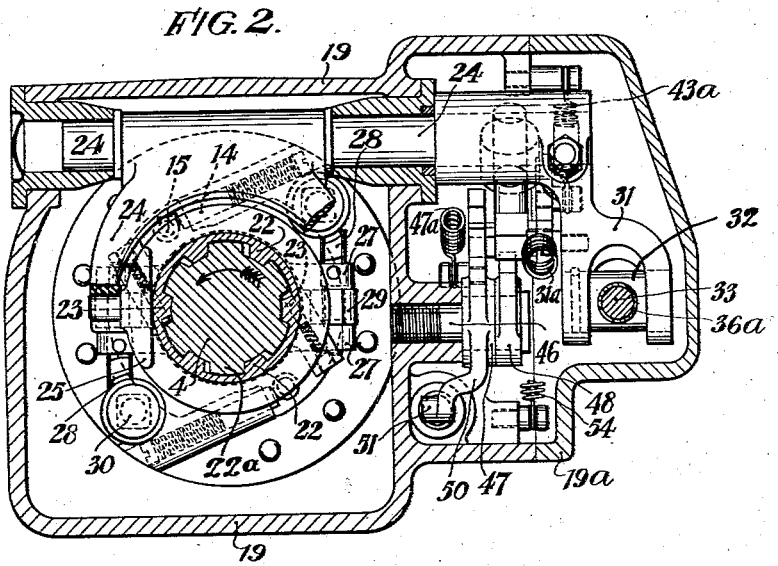
Figure 3:
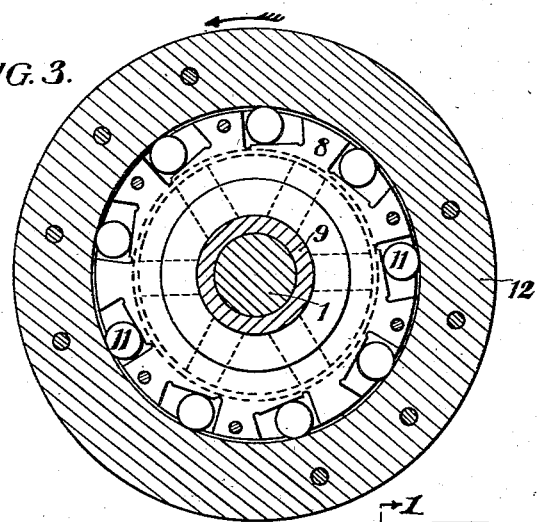

In the construction shown in the drawings, 1 is the driven shaft of a gear box 1a of an automobile and constitutes with the abutment member 2, mounted on splines thereon, the driving member of the device of which the working surface 3 is cylindrical. 4 is the driven shaft of the device formed integral and comprising with the cam member 5 the driven member of the device. The cam member 5 is formed with two sets of wedging faces 5a and 5b (Fig. 1). The main gripping members 6 are mounted in a cage 7 and disposed between the cam member and the abutment member, and are adapted to wedge against the faces 5a in forward drive and 5b in reverse drive. The auxiliary cam member 8 is supported on a sleeve nut 9 screwed on to the gear box driven shaft 1. The auxiliary cam member 8 is held in frictional contact with the abutment member 2 by the stiff spring 10 which is held in compression between the auxiliary cam 8 and a shoulder on the sleeve nut 9. Auxiliary wedging members 11 are disposed between the auxiliary cam member 8 and an auxiliary abutment 12 which is concentrically supported on the cam member 5 by the spigot 13 and riveted to the cage 7. Spring plungers 14 housed in the cage 7 co-act with pegs 15 (Fig. 2) riveted to the cam member 5. The driven shaft 4 is concentrically supported on roller bearings 16 on an extension 17 of the driving shaft 1 and also supported on ball bearings 18 in the main casing 19. The driven shaft 4 is provided with a coupling 20 for connecting to the Cardan shaft of the automobile. The axially slidable restraining member 21 formed with splines 22 (Fig. 2) is mounted on splines 22a on the driven shaft 4, the splines being a loose fit to permit a small angular movement. Spring plungers 23 carried by the slidable member 21 urge the slidable member 21 to one extreme angular position on the splines 22a. A fork 24 pivotally mounted in the casing 19 carries swivelling members 25 (Fig. 2) which engage in the annular groove 26 formed in the slidable member 21. The slidable member 21 is formed with lugs 27 (Fig. 2) which carry pegs 28 adjustably secured thereto by the nuts 29. The cage 7 is provided with conically stepped members 30. The conically stepped members 30 have ledges 30a and 30b which are adapted to co-act with the pegs 28.

Referring to Figs. 5 and 6, the operating crank 31 is keyed to the fork 24 and carries a trunnion 32 through which is supported the actuating rod 33 pinned at one end to the crank 34 and provided at the other end with a nut 35. The trunnion 32 is a sliding fit on the actuating rod 33 which is reduced at one end leaving a shoulder 36 against which a spring cap 36a is pressed by the spring 37. The crank 34 is mounted on a sleeve 38 which is pivotally supported on a pin 39 secured to the casing 19. The sleeve 38 projects through the cover plate 19a (Fig. 1) of the casing 19 and carries a crank 38a. The crank 38a is connected by the link 38b to the engine clutch pedal 38c.

The operating crank 31 is formed with a lug 40 on which is mounted the T shaped member 41 secured thereto by the nut 42. A bell crank trip lever 43 is supported on the pin 39 one arm engaging with the T shaped member 41 and the other arm has an adjustable stop 44 adapted to co-act with a lug 45 on the crank 34.

Mounted side by side on a pin 46 secured in the casing 19 is a cam member 47 and a pivoted lever 48. The cam member 47 co-acts with the T shaped member 41 and has an arm 49 which serves as a stop to limit the travel of the T shaped member 41, and therefore of the crank 31, and thereby to limit the axial movement of the slidable member 21. The cam 47 is formed with an arm 50 which is adapted to co-act with a slidable rod 51 which passes into the gear box and carries the reverse selector fork (not shown). The pivoted lever 48 has a stop 53 which is adapted to be swung into the path of the T shaped member 41 by a spring 54 and to be moved out of the path of the T shaped member 41 by the cam 55 mounted on the pin 56 supported in the casing 19, and keyed to a crank 57 outside the casing. The crank 57 is connected by the link 58 (Fig. 6) to the crank 59 mounted on the cross shaft 60 supported in brackets (not shown) mounted on the chassis. The cross shaft 60 also carries the crank 61 which is connected by a link 62 to the lower extremity of the hand brake lever 63. The bell crank trip lever 43, the cam member 47 and operating crank 31 are each provided with return springs 43a, 47a and 31a.

Figure 4:
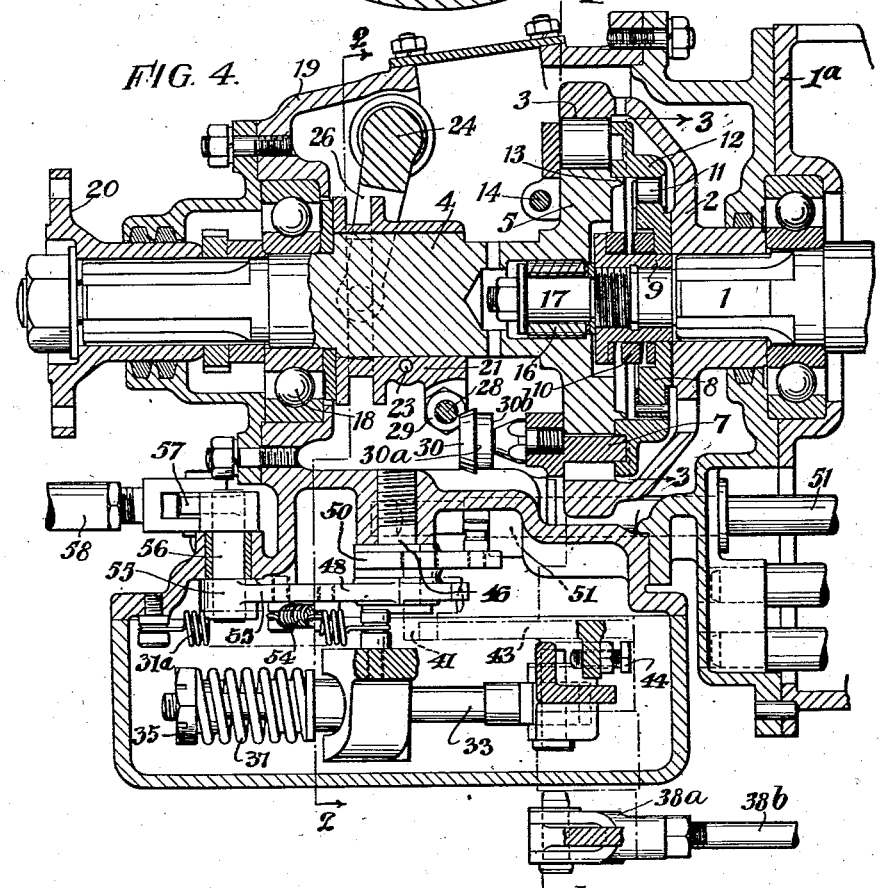
Fig. 4 is a longitudinal sectional view partly in elevation and partly in plan taken on the line 4—4 Fig. 1.

The operation of the device is as follows. When the vehicle is being driven by the engine in any forward gear (forward direction being indicated in the drawings by arrows) and the hand-brake lever 63 is in the position shown in Fig. 6, the axially slidable member 21 (the restraining member) is in the position shown in Fig. 4 and does not restrain wedging members 6, and the device functions as a bi-directional coupling.

In order to change gear the clutch pedal 38c is depressed and the gear lever (not shown) is operated. The clutch pedal 38c is then released. On depressing the clutch pedal 38c, the first part of its movement frees the engine clutch so that the driven member 4 overruns the driving member 1 causing the main wedging members 6 to engage with the faces 5b of the cam member 5. At the same time motion is communicated from the clutch pedal through the link 38b and members 38a, 38, 34, 33 to the nut 35, and causes the spring 37 to be compressed.

Further movement of the clutch pedal brings the lug 45 into contact with the adjustable stop 44 and releases the T shaped member 41 from the trip lever 43, whereupon the operating crank 31 is shot forward by the stored up energy of the compressed spring 37 to a position limited by the cam arm 49.

The movement of crank 31 is accompanied by a movement of the axially slidable member 21 with pegs 28 which co-act with conical portions of the stepped members 30 and causes the cage 7 to be moved against the spring plungers 14 thereby carrying the main wedging members out of engagement with faces 5b. The pegs 28 are carried past the first step only in the conically stepped members 30. The main wedging members are then held in a neutral position between faces 5a and 5b and are positively restrained from wedging against the faces 5b and in this position the device functions as a free wheel, that is to say the driven member 1 of the gear box may rotate at any lesser speed than the Cardan shaft.

The return movement, however, of the axially slidable member 21 is prevented by the pegs 28 engaging the ledges 30a in the stepped members 30 until the driving member 2 has overtaken the driven shaft 4. This usually occurs when the accelerator pedal is depressed, whereupon the auxiliary cam member 8 drives the auxiliary abutment member 12 through the auxiliary wedging members 11 thereby carrying the cage 7 so that the main wedging members engage with the faces 5a of the cam member 5 and transmit the drive.

The movement of the cage 7 causes the ledges 30a of the conically stepped members 30 to disengage from the pegs 28 and permits the axially slidable member 21 to be returned to its normal position (shown in Fig. 4) by the influence of the return spring 31a and bi-directional coupling is automatically restored.

To enable the device to function continuously as a free wheel (i. e. to prevent the automatic restoration of bi-directional coupling) the hand brake lever 63 is moved into an advanced "off" position shown by the dotted line 63a (Fig. 6). This movement of the hand brake lever moves the cam 55 through the members 62, 61, 60, 59, 58, 57 and 56 free of the pivoted lever 48 and allows the stop 53 to be swung into the path of the T shaped member 41 by the spring 54. This movement of the stop 53 cannot of course take place unless the clutch pedal has been depressed. It is to be noted that the cam 55 and lever 48 are so shaped that movement of the hand brake lever between the normal "off" position 63 and an "on" position say 63b produces no movement of the stop 53.

In order to obtain a reverse drive the clutch pedal is depressed thereby causing the axially slidable member 21 to be moved into its intermediate position. The gear lever is then operated to engage reverse gear whereupon the rod 51 is moved longitudinally and operates the cam 47 through the cam arm 50. This removes the cam arm 49 out of the path of the T shaped member which is then caused to travel a further distance and bring the axially slidable member 21 into its other extreme position, the pegs 28 passing beyond the second ledges 30b. In this position of the cage 7 the device functions as a bi-directional coupling. In the form illustrated the device is arranged to become bi-directionally active with the first portion of the movement of the gear lever towards the reverse gear position and the gear itself is subsequently engaged.

It has been previously stated that under certain conditions unlatching of the axially slidable member may occur, although the driving member of the device may not have overtaken the driven member. These conditions arise sometimes when the automobile is travelling over a rough road and powerful brakes are suddenly applied. This may cause a flutter in the Cardan shaft and the effect, momentarily, of rapid deceleration of the cam member. The inertia of the cage 7 may then be sufficient to overcome the pressure of the spring plungers 14 and result in the slidable member 21 becoming unlatched. The small angular movement permitted to the axially slidable member 21, however, allows the inertia of that member to cause that member to follow the similar movement of the cage due to sudden deceleration of the Cardan shaft and thereby preventing unlatching from taking place, under the conditions described.

What I claim and desire to secure by Letters Patent is:—

1. A uni-directional clutch comprising a driving member, a driven member, at least one main wedging member and at least one auxiliary wedging member for assisting the main wedging member to be carried into wedging position, the said auxiliary wedging member being adapted to wedge in one direction of rotation and to be free in the other direction of rotation.

2. A uni-directional clutch according to claim 1, provided with a cage for locating the said main wedging member, the said auxiliary wedging member being adapted to co-act with the cage.

3. A uni-directional clutch comprising a cam member, an abutment member, at least one main wedging member, a cage for locating the main wedging member, at least one auxiliary wedging member for assisting the main wedging member to be carried into wedging position, the auxiliary wedging member being adapted to wedge, in one direction of rotation, between members, one of which is connected with said cage and the other with the abutment member, and to be free in the other direction of rotation.

4. A uni-directional clutch according to claim 1, provided with means to limit the torque capable of being transmitted through the agency of the said auxiliary wedging member.

5. A uni-directional clutch, according to claim 1, provided with means to limit the torque capable of being transmitted through the agency of the said auxiliary wedging member, the said means to limit the torque comprising a yielding member.

6. A uni-directional clutch, according to claim 1, provided with a cage and means to limit the torque capable of being transmitted through the agency of the said auxiliary wedging member, the said means to limit the torque comprising an auxiliary cam member adapted to be in frictional engagement with the driving member of the device, the said auxiliary wedging member being adapted to wedge between the said auxiliary cam member and the said cage.

7. A coupling device comprising a cam member, an abutment member, main wedging members, a cage for supporting and controlling the main wedging members, the said cam member being adapted to wedge in both directions, auxiliary wedging members adapted to assist the main wedging members into engagement in one direction only, a spring to assist the main wedging members into engagement in the other direction, and a restraining member for preventing the main wedging members from becoming wedged in the reverse direction.

8. A coupling device comprising a cam member, an abutment member, main wedging members, a cage for supporting and controlling the main wedging members, the said cam member being adapted to wedge in both directions, auxiliary wedging members adapted to assist the main wedging members into engagement in one direction, a spring to assist the main wedging members into engagement in the other direction, a restraining member for preventing the main wedging members from becoming wedged in the reverse direction, means being provided for maintaining the restraining member in its restraining position so long as the driven member of the device over runs the driving member, together with means for automatically releasing the said restraining member as soon as the driving member has overtaken the driven member.

9. In a coupling device comprising driving and driven members, wedging members, a restraining member for rendering the wedging members inoperative for at least one direction of rotation in combination with means for maintaining the restraining member in its restraining position so long as the driven member of the device over-runs the driving member together with means for automatically releasing the said restraining member as soon as the driving member has overtaken the driven member, the said restraining member being loosely carried on splines on the driven member so that a small angular movement is permitted between the restraining member and the driven member, springs being provided to maintain the restraining member in one extreme angular position with respect to the driven member so that in the event of sudden deceleration of the driven member, the inertia of the restraining member tends to carry it towards the other extreme angular position with respect to the driven member.

10. In an automobile a coupling device comprising driving and driven members, wedging members, a restraining member for rendering the wedging members inoperative for at least one direction of rotation in combination with means for maintaining the restraining member in its restraining position so long as the driven member of the device over-runs the driving member together with means for automatically releasing the said restraining member as soon as the driving member has overtaken the driven member and additional means for preventing the said automatic release from taking place.

In testimony whereof I have signed my name to this specification.

FELIX ALEXANDER JOSEPH.